(12) United States Patent
Boss et al.

(10) Patent No.: US 9,100,300 B2
(45) Date of Patent: Aug. 4, 2015

(54) MITIGATING NETWORK CONNECTION PROBLEMS USING SUPPORTING DEVICES

(71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/925,972

(22) Filed: Jun. 25, 2013

(65) Prior Publication Data

US 2014/0376385 A1     Dec. 25, 2014

(51) Int. Cl.
*H04L 1/00* (2006.01)
*H04L 12/26* (2006.01)
*H04L 12/24* (2006.01)

(52) U.S. Cl.
CPC ........ *H04L 43/0811* (2013.01); *H04L 41/0677* (2013.01); *H04L 43/10* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 7,603,460 B2 * | 10/2009 | Adya et al. | 709/224 |
| 7,774,447 B2 | 8/2010 | Chahal et al. | |
| 8,064,339 B2 | 11/2011 | Sullivan et al. | |
| 2005/0015644 A1 | 1/2005 | Chu et al. | |
| 2005/0144502 A1 * | 6/2005 | Gandhi et al. | 714/4 |
| 2009/0161532 A1 * | 6/2009 | Sullivan et al. | 370/216 |
| 2011/0116385 A1 | 5/2011 | Turlington et al. | |
| 2012/0002553 A1 | 1/2012 | Olson et al. | |
| 2013/0059578 A1 | 3/2013 | Finberg | |
| 2013/0067435 A1 | 3/2013 | Huang et al. | |

FOREIGN PATENT DOCUMENTS

| | | |
|---|---|---|
| EP | 1054533 A2 | 11/2000 |
| EP | 1791294 A1 | 5/2007 |

OTHER PUBLICATIONS

Katz-Bassett, Systems for Improving Internet Availability and Performance, Dissertation, University of Washington, 197 pp., 2012.*
C. Melchoirs; "Troubleshooting Network Faults Using Past Experience"; IEEE; Session Thirteen AI Techniques; pp. 549-562; Copyright 2000 IEEE.

* cited by examiner

*Primary Examiner* — Frank Duong
(74) *Attorney, Agent, or Firm* — Maeve McCarthy (57) ABSTRACT

An approach for mitigating network connection problems when a first computing device is unable to connect to a remote resource is described. A second computing device receives a request for diagnostic testing over a second network from the first computing device. The second computing device performs diagnostic tests on a data path to a desired remote resource. The second computing device sends over the second network, results from the diagnostic tests regarding the data path connectivity to the first device that is unable to connect to desired remote resource. The results are analyzed to determine the location of network connectivity failure.

12 Claims, 4 Drawing Sheets

MITIGATING NETWORK CONNECTION PROBLEMS USING SUPPORTING DEVICES

FIELD OF THE INVENTION

The present invention relates generally to the field of network connectivity and more particularly to mitigating network connection problems.

BACKGROUND OF THE INVENTION

As more and more home and office electronic devices (eg. computers, tablets, notebooks, smart phones, etc.) join the ranks of consumer products that couple and communicate over a network, methods to troubleshoot connectivity are evolving. Diagnostic tools such as Ping and traceroute are examples of commonly used applications to determine the route or data path, and for measuring transit delays of packets across an Internet Protocol (IP) networks. Ping is a computer network utility used to test host accessibility and to measure round-trip time for a message sent from the host to an internet protocol (IP) destination. Traceroute utilities work by sending packets with low time-to-live (TTL) fields. The TTL specifies how many hops the packet is allowed before it is returned. The last host to receive a packet before the TTL is exceeded returns the packet with an error reply and the last host identifies itself in the return packet. By sending a series of packets with increasing TTL's, the traceroute can identify the path of a data route and intermediate hosts.

The increasing number and complexity of computer networks adds to the difficulty of diagnosing network problems and the identification of an actual source or sources of these problems. Broadband connections, while extremely popular, are challenging to troubleshoot for the average user. Additionally, support systems for customers such as helpdesks can be costly for companies to maintain. Opportunities will continue to arise for improved user education, support services, and more automated network connectivity and diagnostic customer tools.

SUMMARY

An approach for mitigating network connection problems when a first computing device is unable to connect to a remote resource is described. A second computing device receives a request for diagnostic testing over a second network from the first computing device. The second computing device performs diagnostic tests on a data path to a desired remote resource. The second computing device sends over the second network, the diagnostic test results regarding the data path connectivity to the first device unable to connect to the desired remote resource. The results are analyzed to determine one or more locations of network connectivity failure.

Aspects of the present invention disclose a method for mitigating network connection problems when a first computing device is unable to connect to a remote resource. A second computing device receives a request for diagnostic testing over a second network from the first computing device. The second computing device performs diagnostic tests on a data path to desired remote resource. The second computing device sends over the second network results from the diagnostic tests regarding the data path connectivity to the first device that is unable to connect to the desired remote resource. The results are analyzed so as to determine one or more locations of network connectivity failure In another aspect, a computer program product for mitigating network connectivity problems is utilized when a first computing device is unable to connect to a remote resource. The computer program product comprising one or more computer-readable storage media and program instructions that are stored on the one or more computer-readable storage media. The program instructions to receive a request for diagnostic testing are sent over a second network from the first computing device. The program instructions comprise performing diagnostic tests on a data path to desired remote resource. The program instructions include sending over the second network diagnostic test results from the diagnostic tests regarding the data path connectivity to the first computing device that is unable to connect to the desired remote resource. The results are analyzed so as to determine one or more locations of network connectivity failure.

In yet another aspect, a computer system is utilized for mitigating network connection problems when a first computing device is unable to connect to a remote resource. The computer system comprising one or more computer processors and/or one or more computer-readable storage media wherein the program instructions are stored on the computer-readable storage media for execution by at least one of the one or more processors. The program instructions comprise receiving a request for diagnostic testing over a second network from the first computing device. The program instructions comprise performing diagnostic tests on a data path to desired remote resource. The program instructions comprise sending over the second network the results from the diagnostic tests regarding the data path connectivity to the first device that is unable to connect to the desired remote resource. The results are analyzed to determine one or more locations of network connectivity failure.

DETAILED DESCRIPTION

As more and more electronic devices enter homes and users' everyday lives, connectivity needs and expectations are rising. Computing devices such as smartphones, personal digital assistant (PDA), tablets, interactive game systems, laptops and computers are becoming commonplace in many homes. Users have come to expect almost constant availability of information and Internet access. The multiple connections, networks and protocols may complicate and challenge users when network connectivity is lost. The myriad of devices and network connections present a challenge for the typical user to work through, sometimes even with the help of a support desk. Support desks and/or support technicians can be costly for companies to provide for users. For these reasons and others, a number of software programs have been developed to aide in diagnosing and providing timely fixes for the computing device associated with a user without support from a helpdesk. Typically, these programs utilize information from the hardware of a device to diagnose and provide improved connectivity. In one example, embodiments of the present invention provide diagnostic support from a nearby or secondary predetermined computing device associated with an individual, such as a computing device of a friend, neighbor or business associate. The computing device associated with the individual may help run network connectivity diagnostic tests from another location and/or over another communications network to aide in locating the source of a loss of network connectivity to a remote resource or internet resource, for example, a webpage, social network site, or cloud service. In one example, an end user troubleshoot connectivity problems with the end user's device associated to a particular network resource by crowd sourcing multiple connectivity requests to other users or devices nearby. These neighboring devices can then perform localized connectivity tests, as well as remote node test(s) and return the test results back to the device associated with the end user or a central system to correlate results and narrow down a particular problem or source of connectivity loss.

Figure 1:
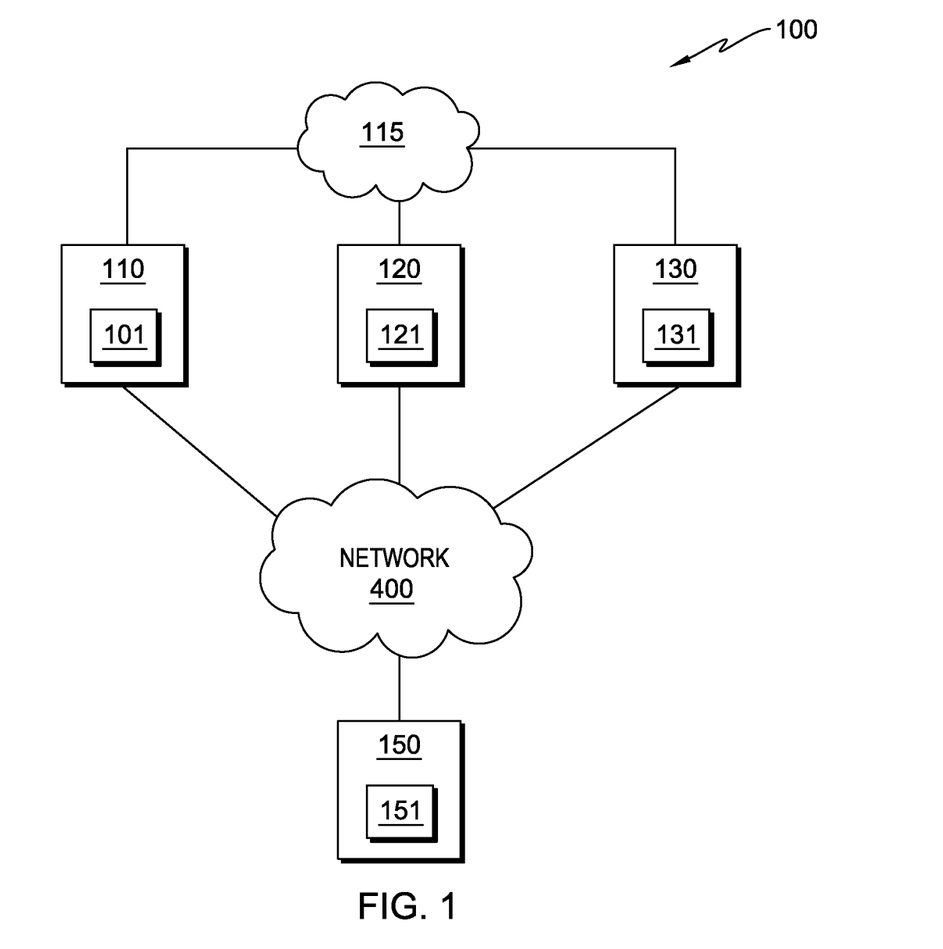
FIG. 1 depicts a data processing system for mitigating network connectivity problems using secondary devices, in accordance with an embodiment of the present invention.

Embodiments of the present invention will now be described in detail with reference to the Figures. FIG. 1 is a functional block diagram illustrating a distributed data processing environment, 100, in accordance with one embodiment of the present invention. The distributed data processing system 100 that is analyzed for network connection problems includes primary device 110, secondary devices 120 and 130, and internet resource 150 connected via network 400. In one example, primary device 110, secondary devices 120 and 130 are connected via alternative network 115. In one example, primary device 110 with diagnostic program 101 in first physical location (LOCATION 1) can be a computer associated with an end user. Secondary device 120 with diagnostics program 121 in a second physical location (LOCATION 2) can be a computer or similar device associated with a co-operative neighboring resident. Secondary device 130 with diagnostics program 131 at a third physical location (LOCATION 3) can be a computer associated with another co-operative neighbor, friend or business associate.

Primary device 110 and secondary devices 120 and 130 can be a computer, laptop, tablet, personal digital assistant (PDA), notebook, smart phone or similar programmable electronic device capable of connecting with the internet resource 150 and that have diagnostic programs 101, 121, and 131, respectively. Diagnostic programs 101, 121, and 131 include utilities like ping, traceroute, data analytics and other similar diagnostic tools.

In one example, internet resource 150 with diagnostic program 151 is a computing device capable of hosting a web page, e-mail, internet site, etc, such as a remote server, cloud or remote computer. In other embodiments, internet resource 150 can be a computer, laptop, tablet, personal digital assistant (PDA), notebook, smart phone or similar programmable electronic device capable of connecting with primary device 110 and secondary devices 120 and 130. Similar to diagnostic programs 101, 121 and 131, diagnostic program 151 has utilities like Ping, traceroute, data analytics and other diagnostic tools Network 400 can be, for example, a local area network (LAN), a wide area network (WAN) such as the Internet, or a combination of the two, and can include wired, wireless, or fiber optic connections. In general, network 400 can be any combination of connections and protocols that will support communications between primary device 110, secondary devices 120 and 130, and internet resource 150.

Alternative network 115 is an alternative communications network such as wireless point-to-point, WIFI, cellular, Bluetooth®, 4G, or powerline, etc. In other examples, alternative network 115 can be a local area network (LAN), a wide area network (WAN) such as the Internet, or a combination of the two, and can include wired, wireless, or fiber optic connections. In general, alternative network 115 can be any combination of connections and protocols that can support communications between primary device 110 and secondary devices 120 and 130.

When primary device 110 cannot connect to internet resource 150, for example, a server hosting a web page, e-mail, cloud system internet resource; primary device 110 broadcasts a request for connectivity diagnostics. Examples may include a co-operative relationship between secondary device 120 and the end user or owner of the primary device 110 so that access, address information and resources can be shared between primary device 110 and second device 120. Secondary device 120 and secondary device 130 may be any computing devices that have agreed upon access by primary device 110. Some examples may be computing devices associated with a predetermined neighbor, business associate or friend in the immediate vicinity or located at a secondary location. The broadcast request would include internet service provider (ISP), domain name system (DNS), source/host name, destination IP/hostname, etc. Upon receiving the diagnostics request from primary device 110, the secondary device 120 performs one or more diagnostic tests. Utilities like ping are initiated to establish if internet resource 150 is accessible to secondary device 120. If a valid communication path is established between the secondary device 120 and internet resource 150, further tests like traceroute can be run between the secondary device and internet resource 150 to verify a data path and intermediate hosts. If a source of the connection failure is identified, secondary device 120 returns this information to primary device 110 along with data for analysis. The data from these tests are reported back to the primary device 110. Additionally, data sets could be sent from secondary device 120 to a central service system e.g. a dedicated server or application utilized for the purpose of analyzing diagnostic test results. The central service system could analyze diagnostic test results from secondary device 120 concurrently with other data sets.

Information reported back to primary device 110 by secondary device 120 would include domain name server (DNS) failure, internet service provider (ISP) failure, destination unknown or other indentified connectivity issues in addition to providing information on data path including intermediate hosts, packet loss and response time. If problem sources are identified, the secondary device 120 can log this information with a trouble ticket with internet resource 150 on behalf of primary device.

Primary device 110 can also request that secondary device 120 send a diagnostic request to internet resource 150 to perform a reverse traceroute from the internet resource 150 to primary device 110. A program such as diagnostic program 151 is installed on internet resource 150 to execute the reverse traceroute from internet resource 150 to primary device 110. This allows the data path to be traced bi-directionally and provides further capability for determining the location of connection failure.

In another example, when primary device 110 cannot make a connection to internet resource 150, primary device 110 broadcasts a request for diagnostic testing over alternative network 115. Alternative network 115 could utilize wireless point-to-point technology or another protocol (e.g. cellular/ CDMA, Bluetooth®, WIFI, wired, powerline) to secondary device 120. Upon completion of diagnostic test(s), secondary device 120 returns data to primary device 110 over alternative network 115.

Figure 2:
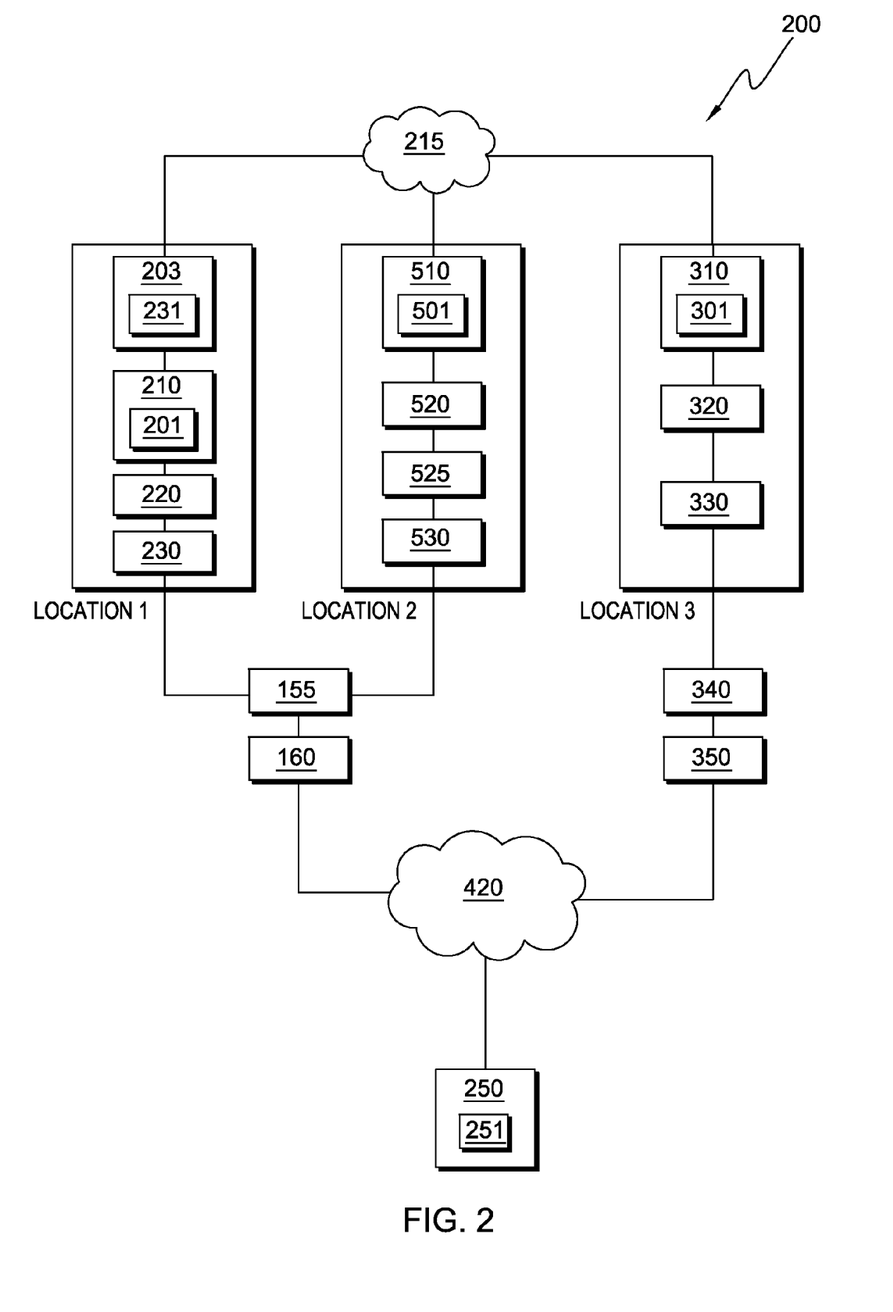
FIG. 2 is a detailed depiction of the data network environment for troubleshooting network connectivity illustrating multiple secondary devices and the connections therebetween, in accordance with an embodiment of the present invention.

Now referring to FIG. 2, FIG. 2 shows a simplified view of network elements in distributed processing environment 200 is depicted so as to illustrate some examples of different data paths from primary device 210, as well as secondary devices 510 and 310 to internet resource 250. From the first location (LOCATION 1), the data path includes a wireless router 220 and cable modem 230 at the first location to a provider neighborhood fiber repeater 150 and cable facility 160 to reach network 420 and internet resource 250.

One embodiment of the present invention includes an ability to collect richer data and more thorough diagnostic analysis by submitting the diagnostic request to multiple secondary devices. When primary device 210 at a first location is unable to connect to internet resource 250, primary device 210 broadcasts over network 420 or an alternative network 215 using diagnostic program 201 to secondary devices 510 and 310, with diagnostic programs 501 and 301, respectively a request for diagnostic testing. In an embodiment of the present invention, an example of alternative network 215 occurs when primary device 210 at the first location does not utilize an ISP of primary device 210 to connect with secondary device 510 at a second location and secondary device 310 at a third location but, instead joins a wireless network (e.g. 802.11 LAN, Bluetooth®) to connect through alternative network 215 with secondary devices 510 and 310, respectfully situated at the second location and third locations.

From the third location (LOCATION 3), a data path of secondary device 310 to internet resource 250 is different than that of primary device 210 and does not use the same ISP as primary device 210. Secondary device 310 can verify if internet resource 250 is available by pinging or directly accessing internet resource 250. Data path secondary device 310 utilizes a data path that comprises wireless router 320 to DSL modem 330 situated within LOCATION 3 to which may be operatively connected to a DSL neighborhood repeater 340, and then through phone company infrastructure 350 to internet 420 and on to internet resource 250. Secondary device 310 can report back the accessibility, traceroute information, DNS information, for example, to primary device 210.

Secondary device 510 at the second location (LOCATION 2) utilizes wireless router 520, Ethernet switch 525 and cable modem 530 within the location. Secondary device 510 uses provider neighborhood fiber repeater 155 and cable operator facility 160 to connect with network 420 and internet resource 250. A data path for secondary device 510 to internet resource 250 utilizes the same ISP with the same neighborhood fiber repeater 155 and cable operator facility 160 as primary device 210. Because primary device 210 and secondary device 510 use the same ISP, additional diagnostics can be performed, for example, by verifying local configuration information so as to connect their ISP and checking that DNS configuration is the same.

Primary device 210 at LOCATION 1 is able to utilize gathered information to determine if the desired internet resource is available to other others. Primary device 210 can also identify if there is a local configuration problem or if there are local ISP connectivity issues since first location and second location share the same ISP. These determinations can be done using common practices of comparing configuration values, route comparisons, for example. Additionally, if primary device 210 is able to identify the network connection problem, primary device 210 can request secondary devices 510 or 310 to report the problem to the internet resource 250 or ISP for the primary device 210.

Another embodiment of the present invention utilizes other devices within the same location to perform diagnostics. For example, within a residence there maybe multiple devices e.g. computers, tablets, smart phones, game systems and other electronic devices that may use different network capabilities or data routes than the primary device experiencing difficulties connecting to internet resource 250. For example, laptop 210 utilizing a WIFI connection may have difficulties not present with smart phone 203 using cellular connection or 4G connection. In this case, laptop 210 may use the WIFI connection to smart phone 203 to request diagnostic support. Smart phone 203 may be used as a secondary device to provide diagnostic capabilities (e.g. ping internet resource) using diagnostic program 231.

Additionally, in yet another embodiment of the present invention, the service provider could provide an optional Remote Diagnostic Service (RDS) which could provide reverse route information that could be beneficial in problem determination. The RDS could run as a separate server or as a service running on the main server of the internet resource 250. The primary device 210 could make a broadcast request to the RDS to initiate a reverse trace. The reverse trace could be run from either the RDS acting as a secondary device or the RDS can pass this request on to internet resource 250 that is unavailable to the primary device and request that a reverse trace be run. The reverse traceroute data generated by RDS is used in the analysis described and could be used in conjunction with additional data from other secondary devices to locate breakdown in the network connection.

Figure 3:
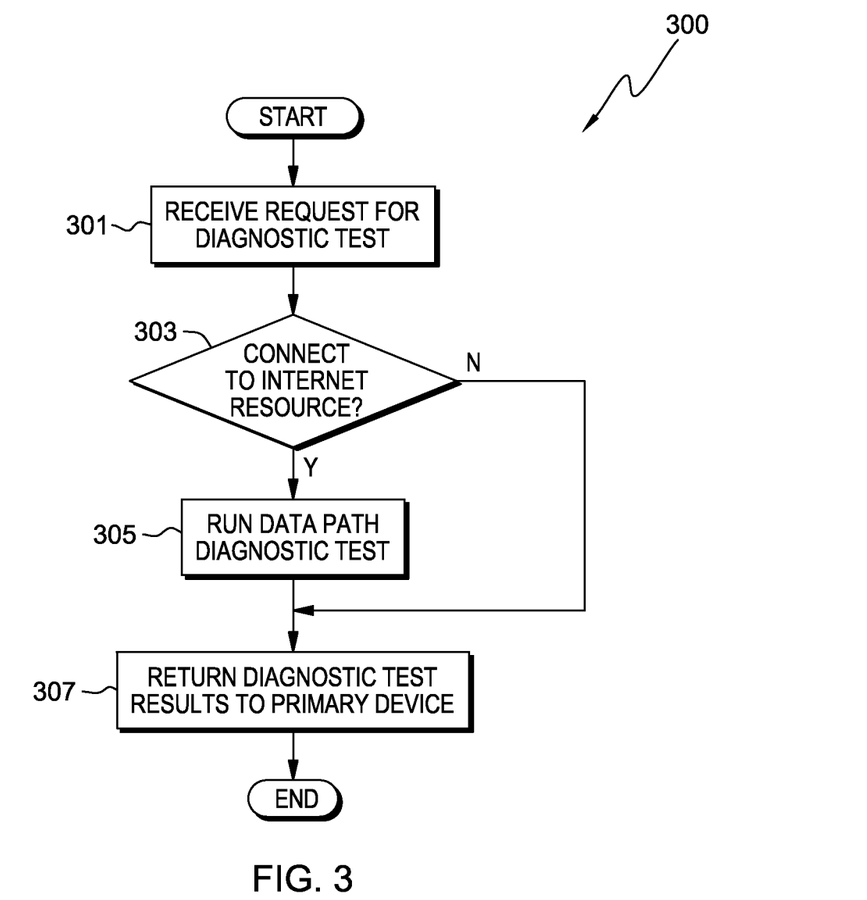
FIG. 3 is a flow chart illustrating the steps of a troubleshooting program installed in a primary computer system that may be executed by a secondary computer system for identifying the source of a network connection problem in accordance with an embodiment of the present invention.

In distributed data processing environment 300, FIG. 3 is a flow chart of secondary device diagnostic program 121 illustrating the steps of diagnostic program 121, according to one embodiment of the present invention. In step 301, diagnostic program 121 executing on secondary device 120 receives a request for diagnostic support from primary device 110 through alternative network 115 when primary device 110 cannot reach internet resource 150 through network 400. In step 303, as a response to this request, diagnostic program 121 executing on secondary device 120 runs a check of the availability of internet resource 150. In one example, diagnostic program 121 executing on secondary device 120 runs a test such as ping to check the availability of internet resource 150. If internet resource 150 is not available to secondary device 120, diagnostic program 121 executing on secondary device 120 returns information from the diagnostic tests relating to unavailability of internet resource to primary device 110. If internet resource 150 is available to secondary device 120, then in step 305, diagnostic program 121 executing on secondary device 120 runs additional diagnostics to identify any intermediate hosts used in the data path. In one example, diagnostic program 121 executing on secondary device 120 runs additional diagnostics, for example, traceroute. In step 307, secondary device 120 returns the results of the diagnostic tests to the primary device 110 through alternative network 115 for further analysis of the communication path to identify the location of possible connection failure.

Figure 4:
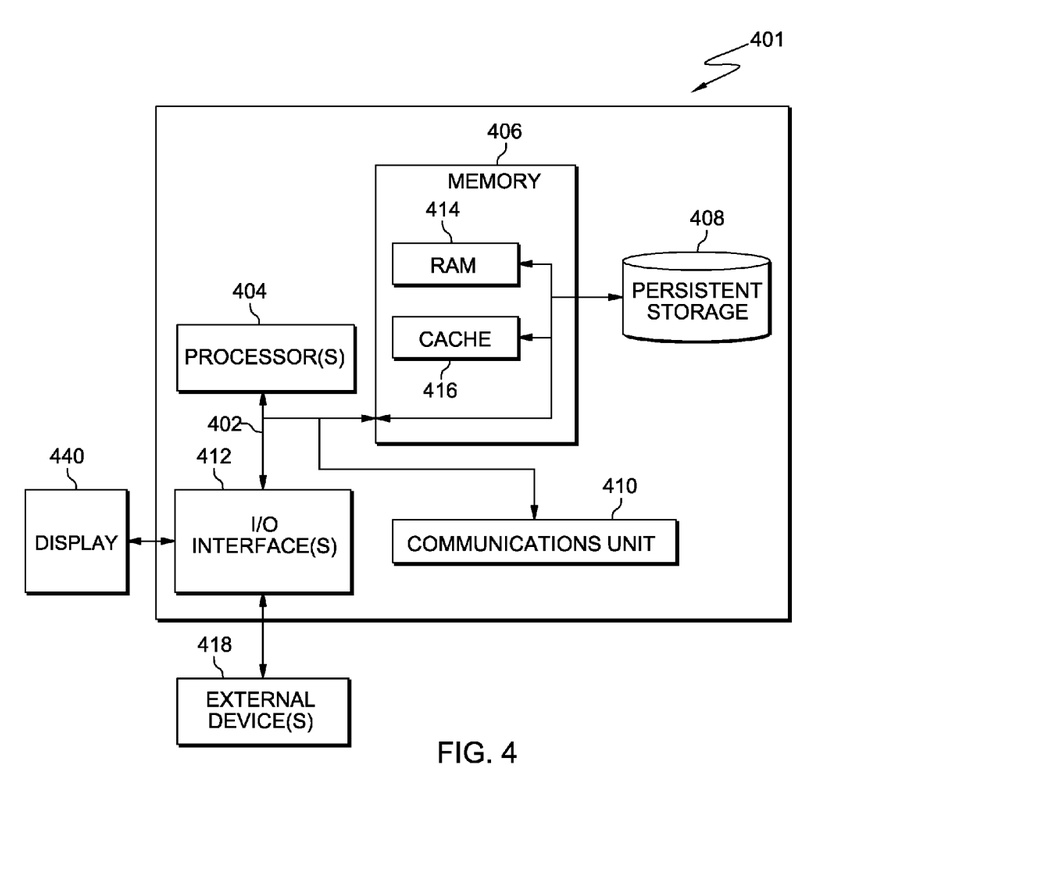
FIG. 4 depicts a block diagram of components of a computer system in accordance with an embodiment of the present invention.

Referring now to FIG. 4, a block diagram depicting components of computer 401, showing one possible implementation of primary devices 110 and 210, devices 120, 130, 203, 510, 310, 150 and 250 (shown in FIGS. 1 and 2) in accordance with an embodiment of the present invention. Modifications to the depicted environment may be made. Computer 401 may include internal and external hardware components, as depicted and described in further detail with FIG. 4. It should be appreciated that FIG. 4 provides only an illustration of one implementation and does not imply any limitations with regard to the environments in which different embodiments may be implemented. Many modifications to the depicted environment may be made.

Computer 401 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Diagnostic programs 101, 121, 131, 151, 201, 231, 501, 301, and 251 (shown in FIGS. 1 and 2) are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 115, network 215, network 400, network 420, and computer 401. In these examples, communications unit 410 includes one or more network interface cards. Communications unit 410 may provide communications through the use of either or both physical and wireless communications links. For example, diagnostic programs 101, 121, 131, 151, 201, 231, 501, 301, and 251 (shown in FIGS. 1 and 2) may be downloaded to persistent storage 408 through communications unit 410.

I/O interface(s) 412 allows for input and output of data with other devices that may be connected to primary device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., diagnostic programs 101, 121, 131, 151, 201, 231, 501, 301, and 251 (shown in FIGS. 1 and 2) can be stored on such portable computer-readable storage media and can be loaded onto persistent storage 408 via I/O interface(s) 412. I/O interface(s) 412 also connect to a display 440.

Display 440 provides a mechanism to display data to a user and may be, for example, a computer monitor, laptop screen or smart phone display.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java® is a registered trademark of Oracle Corporation), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for mitigating network connection problems when a first computing device is unable to connect to a remote resource, comprising:
   a second computing device receiving a request for diagnostic testing over a second network from the first computing device;
   the second computing device performing diagnostic tests on a data path to desired remote resource;
   the second computing device sending over the second network results from the diagnostic tests regarding the data path connectivity to the first device that is unable to connect to the desired remote resource, wherein the results are analyzed so as to determine one or more locations of network connectivity failure;
   the second computing device sending a request to a remote resource to perform a reverse traceroute;
   the second computing device receiving the results of data path connectivity and reverse traceroute results from the remote resource; and
   the second computer device sending results of data path connectivity and reverse traceroute results via the second network to the first computing device.

2. The method of claim 1, wherein a plurality of computing devices receive the request for diagnostic testing from the first computing device over the second network, and the plurality of computing devices return the diagnostic test results regarding the data path connectivity to the first computing device.

3. The method of claim 1, further comprising the second computing device logging a trouble ticket for the first computing device having an unavailable network resource.

4. The method of claim 1, wherein the first network and the second network utilize wireless point-to-point technology.

5. A computer program product for mitigating network connectivity problems when a first computing device is unable to connect to a remote resource, comprising:
   one or more computer-readable storage devices and program instructions stored on the one or more computer-readable storage devices, the program instructions comprising:
   program instructions to receive a request for diagnostic testing over a second network from the first computing device;
   program instructions to perform diagnostic tests on a data path to desired remote resource;
   program instructions to send over the second network the diagnostic test results from the diagnostic tests regarding the data path connectivity to the first computing device that is unable to connect to the desired remote resource wherein the results are analyzed so as to determine one or more locations of network connectivity failure;
   program instructions to receive a request for diagnostic testing over a second network from the first computing device;
   program instructions to send a request to desired remote resource to perform a reverse traceroute;
   program instructions to receive the results of data path connectivity and reverse traceroute results from remote resource; and
   program instructions to send results of data path connectivity and reverse traceroute via the second network to the first computing device.

6. The computer program product of claim 5, wherein a plurality of computing devices receiving from first computing device the request over second network for diagnostic testing, and the plurality of computing devices returning results regarding the data path connectivity to the first computing device for analysis.

7. The computer program product of claim 5, wherein second computing device receiving diagnostic request from the first computing device over alternative network, second computing device performing diagnostic tests, second computing device logging a trouble ticket for the first computing device having an unavailable network resource.

8. The computer program product of claim 5, wherein the first network and the second network utilize wireless point-to-point technology.

9. A computer system for mitigating network connection problems when a first computing device is unable to connect to a remote resource, the computer system comprising:
- one or more computer processors;
- one or more computer-readable storage devices;
- program instructions stored on the computer-readable storage devices for execution by at least one of the one or more processors, the program instructions comprising:
- program instructions to receive a request for diagnostic testing over a second network from the first computing device;
- program instructions to perform diagnostic tests on a data path to desired remote resource;
- program instructions to send over the second network the results from the diagnostic tests regarding the data path connectivity to the first device that is unable to connect to the desired remote resource wherein the results are analyzed so as to determine one or more locations of network connectivity failure;
- program instructions to receive a request for diagnostic testing over a second network from the first computing device;
- program instructions to send a request to desired remote resource to perform a reverse traceroute;
- program instructions to receive the results of data path connectivity and reverse traceroute results from remote resource; and
- program instructions to send results of data path connectivity and reverse traceroute via the second network to the first computing device.

10. The computer system of claim 9, wherein a plurality of computing devices receiving from first computing device the request over second network for diagnostic testing, and the plurality of computing devices returning results regarding the data path connectivity to first computing device for analysis.

11. The computer system of claim 9, wherein second computing device receiving diagnostic request from the first computing device over alternative network, second computing device performing diagnostic tests, second computing device logging a trouble ticket for first computing device having an unavailable network resource.

12. The computer system of claim 9, wherein the first network and the second network utilize wireless point-to-point technology.

\* \* \* \* \*